INFORMATION POSITION IDENTIFYING SYSTEM

Filed March 1, 1955 3 Sheets-Sheet 1

INVENTOR.
DANIEL L. CURTIS
BY Henry Heyman
ATTORNEY

INFORMATION POSITION IDENTIFYING SYSTEM

Filed March 1, 1955 3 Sheets-Sheet 2

INVENTOR.
DANIEL L. CURTIS
BY Henry Heyman
ATTORNEY

INVENTOR.
DANIEL L. CURTIS
BY Henry Heyman
ATTORNEY 3,039,084

INFORMATION POSITION IDENTIFYING SYSTEM

Daniel L. Curtis, Manhattan Beach, Calif., assignor to Hughes Aircraft Company, Culver City, Calif., a corporation of Delaware Filed Mar. 1, 1955, Ser. No. 491,368
12 Claims. (Cl. 340—174.1)

Figure 1:
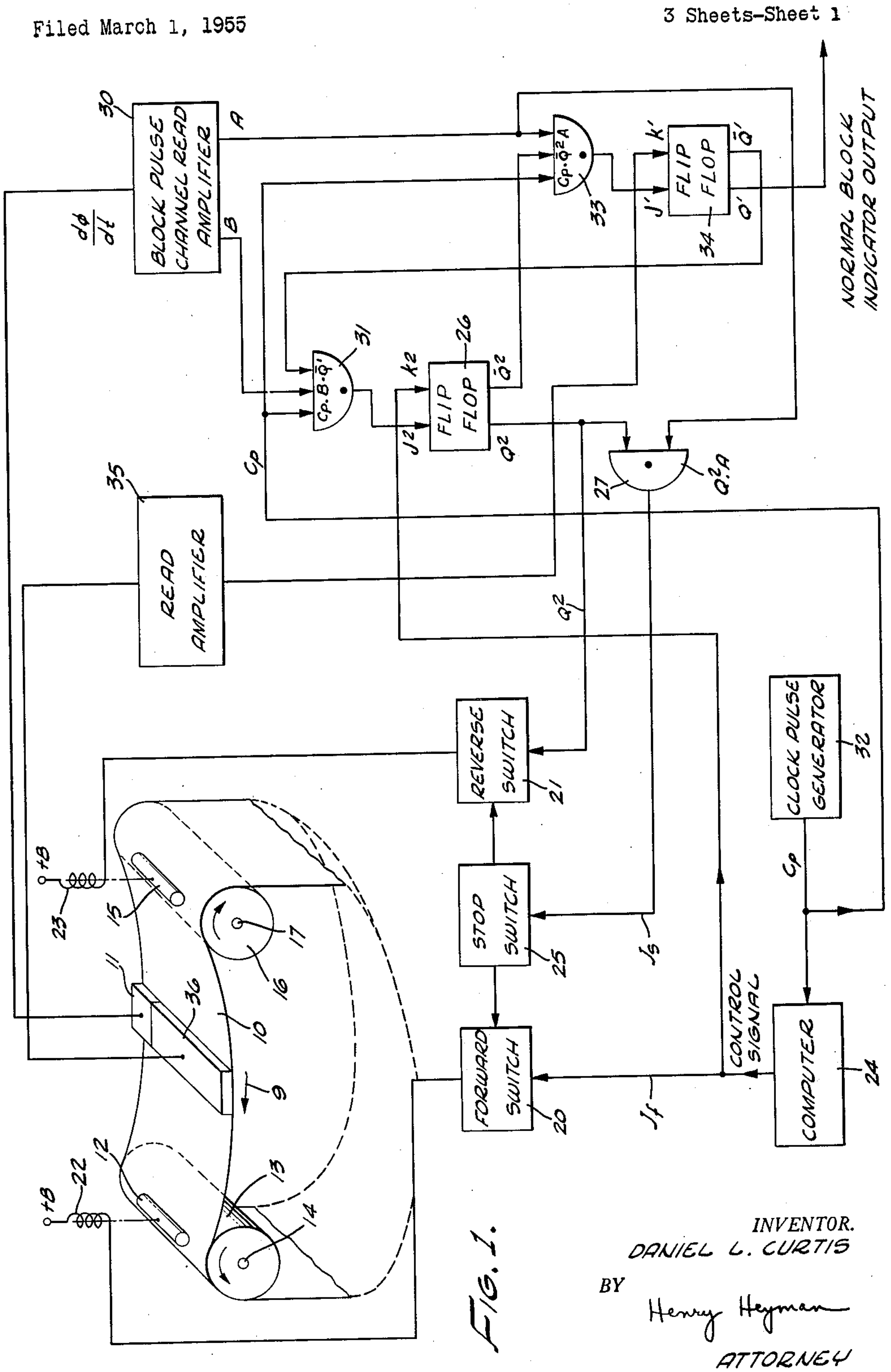

This invention relates generally to information storage in electronic digital computers, and, more particularly, to a method of and apparatus for identifying an information position previously recorded on a closed-loop magnetic tape.

An alterable information block marking system using magnetic tape has been described in copending U.S. patent application Serial No. 484,221 for "Identifying Block Marker System" by Daniel L. Curtis, filed January 26, 1955, now Patent No. 2,923,589. The use of the three-state magnetization system therein described is common to both the invention of the copending application and the present invention. Positive magnetic dipole saturation of a discrete cell which may arbitrarily represent a binary 1 on the block pulse channel of the magnetic tape was there employed as an identifying mark to indicate the beginning of an information block recorded in other parallel channels of the magnetic storage tape. Negative saturation of the cell representing a binary 0 in the block pulse channel, while therein mentioned, was not particularly germane to that invention. It is this negative mark with which the present invention deals. Magnetic dipoles oriented to represent a 0 in the block pulse channel are presently employed as an identifying mark to indicate the beginning of the last information block of a series of blocks of words recorded on the tape.

One type of memory or date storage system for an electronic digital computer consists of a plurality of closed-loop magnetic tapes. In extracting previously recorded information from the storage system, the closed-loop tapes are sequentially presented to a magnetic read head or heads. Some means must be provided for the computer to sense that it has reached the end of information on a particular tape, i.e., that the next information block to follow should not be read, as it is the block which had first previously been read. The provision of such sensing means is necessary for several reasons, one being to provide an order to the computer to stop reading the tape in question, and to being reading the succeeding tape. Another important reason for the provision of such an end of information sensing means is to provide a signal for a control, which will preclude the possibility of having the computer read or write past this end of information point. It is, therefore, desirable to have the tape stop moving relative to the magnetic head and to further provide some means to prevent the computer at some later time from reading or writing past this end of recorded information of the tape in question.

The computer while extracting information might previously have consulted other tapes in the storage system before inadvertently returning to the particular tape rather than correctly going to the next tape in order. Such an occurrence would be highly undesirable. If the magnetic head had already read the recorded 0 (indicating that the end of information position had been reached) and in response to such reading signaled the computer to stop the tape, inadvertent restarting of the tape from a position beyond the 0 would result in confusion. The computer would then incorrectly be re-extracting the old information rather than correctly proceeding to the succeeding and desired information recorded in other tapes included in the storage system. That is to say, it would again begin to read the first block of information at the beginning of the closed-loop tape when it should instead be reading some other tape.

What is therefore desired is an indication signal to the computer, whenever it wrongly asks for this particular tape or any other tape to be started which tape it had previously finished reading. Such a signal would indicate that this particular tape ought not to be started in motion relative to the read head, but instead that the next or logically succeeding tape in the storage system should be used. Various standard type memory devices could be employed to remember the fact that the 0 in the block pulse channel had been read, indicating that the end of information on the tape had previously been reached. Such a memory device might be a flip-flop, or some other bistable electronic memory device such as a relay which has to be associated with each tape. The use of such memory means, however, has certain disadvantages. Increased size of the computer will result. The power consumption will rise and the cost of the computer will also be increased. Furthermore, if an appreciable number of tapes is to be used, each tape would require a storage device together with concomitant rectifier matrices. Each matrix would have to set, sample, and reset the individual storage devices, i.e., flip-flops or relays. What would therefore be desirable is to provide an end of information memory system free of the disadvantages inherent in the above-described individual flip-flop of relay memory devices associated with each tape.

Accordingly, one object of the present invention is to provide a method of remembering that the end of information on a closed-loop magnetic storage tape has been reached.

Another object of this invention is to provide a method of making certain that a particular magnetic tape loop of a multiplicity of tapes once read, will not inadvertently be re-read.

Still another object of the invention is to provide a system for remembering the end of information position location of a closed-loop magnetic storage tape as indicated by a previously recorded end of information pulse disposed in the block pulse channel of the particular tape which does not require complex circuitry.

In accordance with the present invention means for remembering that the end of information position had been reached is provided by causing the particular tape to be returned to a position, after its end of information pulse has been read, to have the pulse again be re-read, i.e., the tape is returned to its pre-read position. The method of the present invention involves the steps of: reading such end of information pulse, stopping the forward motion of the tape, and reversing its motion for a predetermined period of time. This will then position the end of information pulse again in a pre-read position, thus effectively storing this information, that is, that the end of information position had been reached.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purposes of illustration and description only, and are not intended as a definition of the limits of the invention.

Figure 2A:
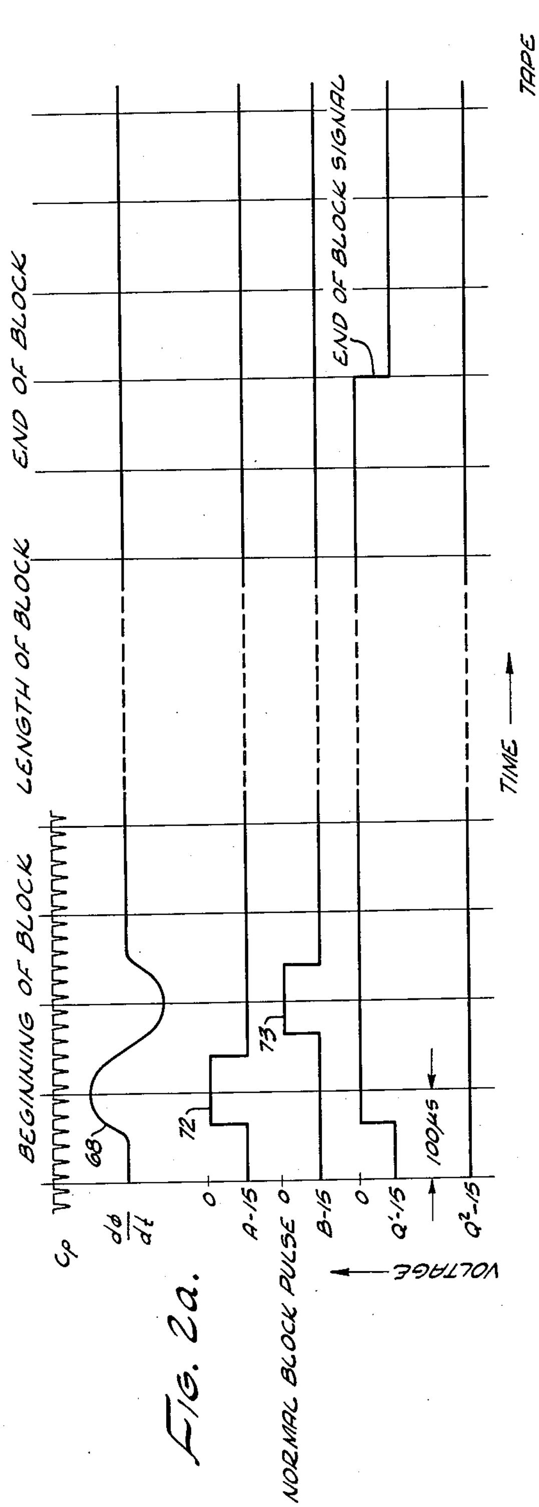
Figure 2B:
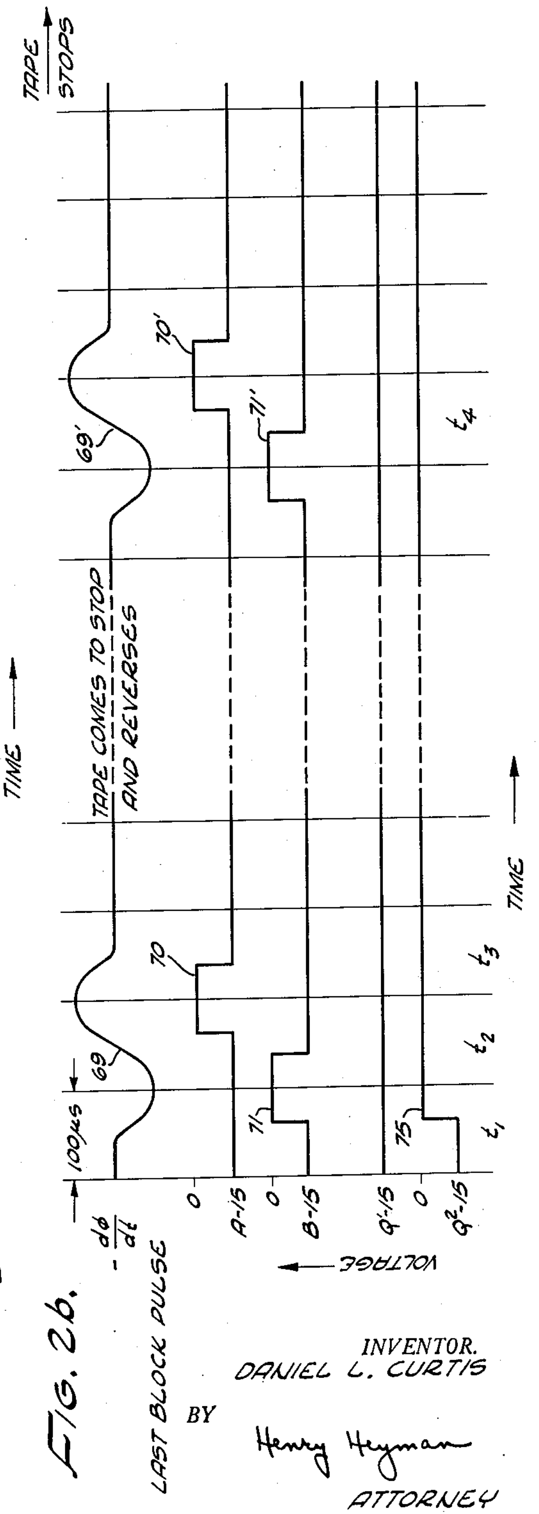
Figure 3:
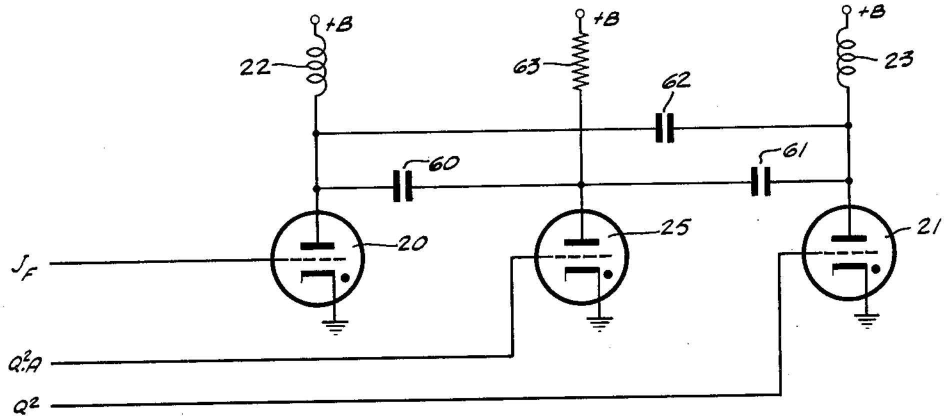
Figure 4:
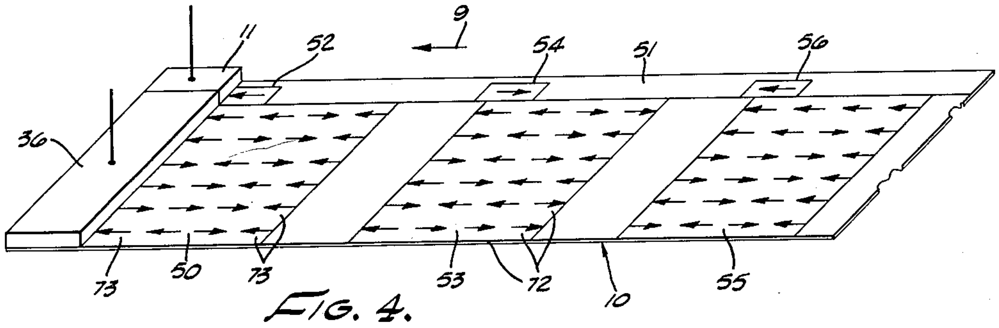
Figure 5:
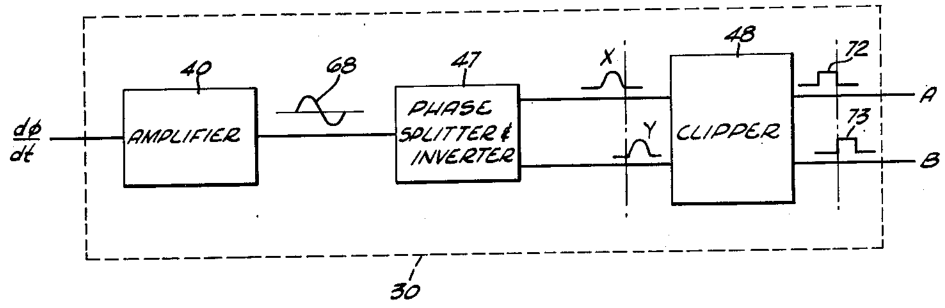

In the accompanying drawings:

FIG. 1 is a block diagram of a system for identifying and storing the end of information pulse in accordance with the invention;

FIGS. 2*a* and 2*b* are graphs showing, as a function time, the voltages developed by various flip-flops and by the block pulse channel read amplifier included in the system of FIG. 1 as well as the derivative of the flux with respect to time of the magnetic dipole arrangements at indicated discrete portions on the block pulse channel;

FIG. 3 is a circuit diagram of the magnetic-tape reel-drive switching thyratrons included in the system of FIG. 1;

FIG. 4 is a view in perspective of a magnetic tape, a block pulse head, and information read head showing their physical locations with respect to each other as included in FIG. 1 as well as a schematic illustration of the dipole arrangement of the block pulses with respect to the information channels recorded on the tape; and FIG. 5 is a block diagram illustrating schematically some of the details of the block pulse channel read amplifier shown in FIG. 1.

Referring now to the drawings wherein like reference characters designate like or corresponding parts throughout the various figures, there is shown in FIG. 1, one system employing the method and apparatus embodying the invention. The system of FIG. 1 includes a tape 10 which may be one of a plurality of tapes, not shown. The arrow 9 drawn below the tape 10 arbitrarily designates the direction of motion of the tape, hereinafter to be referred to as "forward." Tape 10 is driven forward past a magnetic block pulse head 11 whenever a forward jam roller 12 is jammed against a continuously forward revolving capstan 13. Capstan 13 is driven about its axis 14 by a drive device not shown and will drive the tape 10 in a forward direction. By the same token, the alternate jamming of jam roller 15 against continuously reverse revolving capstan 16 will serve to drive the tape 10 in a direction opposite that produced by the combined action of forward jam roller 12 and capstan 13, hereinafter to be referred to as the reverse direction. Capstan 16 is similarly driven about its axis 17 by another drive device not shown in a direction to cause reverse motion of the tape.

The full length of tape 10, and the other tapes in the storage system are not shown as they are not required to explain the nature of this invention. Jam rollers 12 and 15 are controllably actuated by their associated solenoid coils 22 and 23. Forward and reverse switches 20 and 21 provide the control signals to energize solenoid coils 22 and 23, respectively. When forward switch 20 is actuated, current flows through solenoid coil 22, actuating the jam roller 12 to force it against capstan 13, thus causing the tape 10, positioned between capstan 13 and jam roller 12, to be driven forward. Similarly, whenever reverse switch 21 is actuated, current flows to energize solenoid coil 23 which forces jam roller 15 to jam against revolving capstan 16 thus causing tape 10 positioned between capstan 16 and jam roller 15 to be driven in the reverse direction.

The aim of the present invention is to store the information, without the use of specific memory devices, for each tape of a series of tapes in a magnetic storage system, that the end of information position had previously been reached. This is accomplished by reading an end of information marker, stopping the forward motion of the tape, and reversing the tape's motion in response to a second reading of the marker signal for a predetermined period of time and finally bringing the tape to a stop; thus positioning the end of information marker again in a pre-read position. This is accomplished by selectively actuating forward switch 20, reverse switch 21 and a stop switch 25 to control the jam rollers 12 and 15 to direct the motion of the tape 10. The system shown in FIG. 1 provides the necessary electrical signals to switches 20, 21 and 25 when required by a method and apparatus now to be explained.

Basically, the information is recorded on tape 10 in channels (herein arbitrarily 6 information channels are assumed and illustrated) which are recorded on that portion of the tape 10 which travels past a magnetic read head 36. Block pulse head 11 is disposed to read block pulses recorded in a block pulse channel provided on the tape 10 and which are substantially coincident with or adjacent to the beginnings of information blocks recorded in the information channels of the tape 10. Read amplifier 35 receives signals which are developed by head 36 as the tape 10 moves past head 36. The signals developed by head 11 are received as the input to block pulse channel read amplifier 30. FIG. 1 indicates that two output signals designated A and B are developed by amplifier 30. The output signals A and B are generated by amplifier 30 in a manner which may best be explained by reference to FIG. 5.

Amplifier 30, as shown in FIG. 5, consists of three basic elements, namely, amplifier 40, phase shifter and inverter 47, and clipper circuit 48. An input signal $$\frac{d\phi}{dt}$$

the change of flux with respect to time of the recorded signal represented by the arrangement of magnetic dipoles on the block pulse channel, to which magnetic head 11 is responsive, appears as the input to amplifier 40. When head 11 reads a binary 1 recorded on the block pulse channel of tape 10, indicating that the head 36 now is beginning to read information recorded in the information channels of tape 10, a signal $$\frac{d\phi}{dt}$$

will appear at block pulse channel read amplifier 30, whose first stage consists of amplifier 40. FIG. 2*a* illustrates a curve 68 representing signal $$\frac{d\phi}{dt}$$

which is impressed as the input to amplifier 40 when a normal block pulse marker appears below head 11. Signal $$\frac{d\phi}{dt}$$

indicated as sine wave 68 in FIG. 2*a* and plotted as a function of time is amplified by amplifier 40 and is impressed on phase splitter and inverter circuit 47. Phase splitter and inverter 47 divides the sine wave 68 into two half-cycle portions illustrated as X and Y in FIG. 5. X represents the first half-cycle portion of sine wave signal 68, while Y represents the second half-cycle portion. The first half-cycle portion X is unaffected by circuit 47 and thus appears as a positive one-half sine wave after passing therethrough. Signal Y previously having been negative is inverted so that it also will appear as a positive one-half sine wave. Signals X and Y are then separately impressed on clipper circuit 48 which clips signals X and Y to make them appear as square wave signals A and B (shown as 72 and 73 in FIGS. 2*a* and 5).

FIG. 2*b* diagrammatically illustrates a signal 69 which is developed at head 11 and amplified by amplifier 30 when head 11 reads a binary 0 represented by the last block pulse marker indicating the beginning of the last information block is now passing under head 36. It is this last block marker whose position this system seeks to store. This signal 69 representing a voltage $$-\frac{d\phi}{dt}$$

is 180° out of phase with signal 68. As was explained with reference to signal 68, signal 69, after passing through amplifier 40, phase splitter and inverter 47 and clipper 48 is divided into two square wave components A and B designated 70 and 71 in FIG. 2*b*. It should be noted that in FIG. 2*b* signal A lags signal B in point of time. It is thus apparent that signals 70 and 71 representing A and B are only presented as outputs from amplifier 30 whenever a signal $$-\frac{d\phi}{dt}$$

is impressed on amplifier 30 by head 11.

The distance between the vertical lines on the graph of FIGS. 2*a* and 2*b* may coincide, for example, with hundred microsecond intervals. The clock pulse signals $C_p$ illustrated in FIG. 2*a* are arbitrarily approximately six microseconds apart. As may best be seen in FIG. 2*a* the relationship between signal $$\frac{d\phi}{dt}$$

for the beginning of a normal block pulse, and signals A and B is such that A occurs at the first one-half cycle of signal $$\frac{d\phi}{dt}$$

and B at the second one-half cycle of such signal. The relationship between signal $$-\frac{d\phi}{dt}$$

representing the beginning of the last information block, and signals A and B, as alternately shown in FIG. 2*b*, is such that B occurs at the first one-half cycle of signal $$-\frac{d\phi}{dt}$$

and A at the second one-half cycle of such signal. Thus there is a time delay between signals A and B, with signal B leading signal A when the last block pulse marker is read by head 11. In the present invention we are concerned only with the occurrence of a signal $$-\frac{d\phi}{dt}$$

In order to further understand and explain the operation of the system, we may make use of the mathematical notations of Boolean algebra:

$$J^1 = A.\overline{Q}^2.C_p \qquad (1)$$

$$J^2 = B.\overline{Q}^1.C_p \qquad (2)$$

These mathematical expressions indicate that for the signal $J^1$ or $J^2$ to appear, their respective "and" gates require the simultaneous receipt of the signals associated with $J^1$ and $J^2$ respectively. The dot represents the logical plus meaning that what is required is the presence of each and every signal in the equation which is preceded or succeeded by a dot. The "and" gates are shown schematically in FIG. 1 by semicircles with a dot contained therein. An "and" gate, as used herein is defined in an article entitled "Standards on Electric Computers: Definition of Terms, 1950" in "Proceedings of the I.R.E.," for March 1951, pp. 271 through 277, inclusive.

The actuation of switches 20, 21 and 25 which control the motion of tape 10 depends on the occurrence of certain signals whose generation will now be explained.

"And" gate 31 shown in FIG. 1 will produce output signal $J^2$ when the following three signals are simultaneously applied thereto: $\overline{Q}^1$ from flip-flop 34, B from block pulse read amplifier 30, and a pulse $Cp$ from clock pulse generator 32. Signal $Cp$ is impressed on "and" gate 31 by clock pulse generator 32 which, as previously explained, produces synchronizing clock pulses at approximately six microseconds repetition rate. "And" gate 27 will generate an output signal $J_s$ whenever it simultaneously receives signals $Q^2$ and A from flip-flop 26 and amplifier 30, respectively. The presence of signal $\overline{Q}^1$ will be assumed for the time being and its occurrence will be explained later. As previously explained signal B is one of the two output signals of amplifier 30. In order for "and" gate 33 to generate output signal $J^1$ the simultanoeus receipt thereto of signals A, $\overline{Q}^2$ and $Cp$ is required. The occurrence of signal A has previously been explained, as well as has signal $Cp$ from clock pulse generator 32 leaving only the occurrence of signal $\overline{Q}^2$ to be accounted for.

Flip-flop 26 is a typical bistable electronic device having a 1 and a 0 input circuit and having first and second output terminals which produce output signals indicating the stable state of the device. One stable state of the flip-flop is arbitrarily referred to as the "high" or "Q" stable state, the opposite stable state being referred to as the "low" or $\overline{Q}$ stable state. When a flip-flop is in its high or Q state it is characterized by a relatively high voltage level at its first output terminal and a relatively low voltage level at its second output terminal. Alternatively, when a flip-flop is in its low or $\overline{Q}$ state it is characterized by a relatively low voltage at its first output terminal and a relatively high voltage level at its second output terminal.

Flip-flop 26 will be in its high state representing a binary 1 or $Q^2$ whenever signal $J^2$ from "and" gate 31 is impressed thereto. Signal $K^2$, when impressed as the input on flip-flop 26, will cause an output signal $\overline{Q}^2$ which represents the low or 0 state of flip-flop 26. Signal $K^2$ is obtained directly from computer 24. Whenever read amplifier 35 generates output signal $K^1$, flip-flop 34 has its output in its low state designated as $\overline{Q}^1$ as previously explained with respect to flip-flop 26. Contrariwise, when "and" gate 33 develops output signal $J^1$ and this signal is impressed on flip-flop 34, the flip-flop will be in its high state, its output signal being designated $Q^1$. Signal $Q^1$ is not used for control purposes in the system disclosed in this invention but merely acts as a normal block indicator output.

As described in the applicant's copending application, the block pulse head 11, upon receipt of a predetermined signal, herein designated $$\frac{d\phi}{dt}$$

will orient the magnetic dipoles of a cell on the tape 10 to store a 1 or 0 wherever desired on the block pulse channel of the magnetic storage tape. This may be effected either by the method described in the copending application, which will mark the end of information position by a 0, or any other method which will produce such an identifying magnetic marker. In any event the present invention merely operates on and in cooperation with a previously marked tape wherein the end of information is indicated by a binary 0 at the appropriate position on the block pulse channel.

Referring now to FIG. 4, the operation of the present invention will be explained. As the tape 10 moves forward in the direction indicated by the arrow 9, information block 50 will next be presented to head 36. The block pulse channel 51 will simultaneously present a binary 1, as indicated by the arrow in the rectangle 52 pointing from right to left, to the block pulse head 11 as the information block 50 passes under the head 36. It will be assumed that the succeeding information block 53 is the last information block recorded on tape 10. The block pulse channel 51 will therefore properly have recorded a 0 marker 54 at the beginning of last information block 53 as indicated by the arrow in the rectangle 54 pointing from left to right. It might be noted in passing, that at the end of normal information block 50 which may be any but the last, there appears a binary 111111, which is represented by the six arrows pointing from right to left in the six information channels at the end of information block 50 of tape 10. When the block 53 comes to be positioned under head 36 as the tape continue its travel forward, the binary 0, represented by rectangle and arrow 54, will simultaneously be presented to head 11. Rectangle 54, representing a binary 0, will create a voltage $$-\frac{d\phi}{dt}$$

as shown on the graph of FIG. 2*b*. This signal indicates that the last information block is now starting under head 36. If there should be no provision to remember the past occurrence of this fact, there will be nothing to prevent tape 10 from later inadvertently continuing to be read in the forward direction when such is not desired. As this is a closed-loop tape, the next information block 55 which follows is the first information block of the tape 10. The block pulse channel 51, therefore, will have recorded a binary 1 indicated by an arrow in the rectangle 56 on the block pulse channel 51 coincident with the beginning of information block 55. What is therefore desired is a method for avoiding the reading of such block 55 before all other tapes in the storage system of the computer have been read. The explanation of the present system to preclude the possibility of the occurrence of such a contingency requires an understanding of the switching circuit shown in detail in FIG. 3.

Tubes 20, 21 and 25, respectively, act as switches indicated by the rectangles 20, 21 and 25 in FIG. 1. These tubes may be conveniently ordinary thyratron gas tubes. The plate circuits of tubes 20 and 21 are coupled through solenoid coils 22 and 23 to a source of +B potential. The plate circuit of tube 25 is coupled to +B through resistor 63. Each of the plate circuits of the respective tubes is capacitor coupled with respect to each other, capacitor 60 being employed as the coupling capacitor between thyratrons 20 and 25, capacitor 61 between thyratrons 25 and 21, and capacitor 62 between thyratrons 20 and 21.

In considering the operation of the thyratron switching circuit of FIG. 3, it will initially be assumed that all three thyratrons 20, 21, and 25 are non-conducting. Accordingly, the anode of each thyratron is at a potential equal to the voltage of source +B. When a triggering signal is applied to the control grid of forward thyratron 20, the thyratron is rendered operable and quickly commences to conduct current through the circuit comprising: source +B, solenoid coil 22, and thyratron 20 to ground. As a result, the potential at the anode of thyratron 20 suddenly drops to a lower value, which is substantially lower than +B, this negative change in voltage being impressed through coupling capacitors 60 and 61 at the anodes of stop thyratron 25 and reverse thyratron 21. Thus, at the moment that forward thyratron 20 commences to conduct current, the anodes of thyratrons 25 and 21 are brought to a sufficiently low potential to prevent these thyratrons from conducting current. In other words, thyratrons 25 and 21 cannot conduct current as their respective anode voltages are too low. However, following the initial drop of potential at the anodes of thyratrons 25 and 21, the potentials at these two anodes begins to rise exponentially due to the charging of capacitors 60, 61 and 62 through resistor 63 and solenoid coil 23, respectively. Stated differently, the potential at the anodes of thyratrons 25 and 21 will ultimately return exponentially to their initial +B value. At this point, thyratrons 25 and 21 are no longer rendered inoperable because of the low potential appearing at their respective anodes and a triggering pulse applied to the input of either thyratron will render that thyratron conducting and the other thyratron in the circuit will be cut off in the same manner as previously described.

It will be noted that tubes 25 and 21 each require at least a signal $Q^2$ at the input of their grids for the respective tubes to conduct. Stop thyratron 25 requires a signal A in addition to the simultaneous receipt of an input signal $Q^2$ therewith.

A signal $$-\frac{d\phi}{dt}$$

appears as the input to the block pulse channel amplifier 30 when the head 11 reads the last block marker 54 as indicated in FIG. 2*b*. Signal B, in conjunction with signal $\overline{Q}^1$, and a synchronizing clock pulse *Cp* from pulse generator 32 will cause "and" gate 31 to generate output signal $J^2$ as the input to flip-flop 26. Signal $Q^2$ will thus be generated as the output of flip-flop 26. This signal $Q^2$, designated 75 in FIG. 2, will at time $t_1$, be applied to the input grid of tube 21. The firing of tube 21 by the impressed signal $Q^2$ will cause forward thyratron 20 to be rendered non-conducting as previously explained. This will cause solenoid coil 22 which will no longer draw current to disengage jam roller 12 from capstan 13 thus removing the forward drive force from tape 10 resulting in its being brought to rest. A further result will be that solenoid coil 23 will now draw current causing jam roller 15 to engage capstan 16 thus moving tape 10 in the reverse direction. As a further result of the firing of tube 21, tube 25 similarly will be unable to conduct. At time $t_2$ while signal $Q^2$ remains as the output of flip-flop 26, signal A will also be impressed at the input of "and" gate 27. As a consequence signal $J_s$ is applied to the input of tube 25. During the time interval between times $t_2$ and $t_1$, signal $Q^2.A$, that is, signal $J_s$, is unable to fire tube 25 because the anode voltage of tube 25 is too low. When tube 21 conducts, its anode falls from +B volts to that value of voltage ordinarily appearing across a conducting thyratron, herein arbitrarily assumed to be 8 volts.

The anode of tube 25 which had previously been at +B volts (arbitrarily +B volts will be assumed to be 300 volts) will thus also fall to approximately 8 volts at a time arbitrarily indicated $t_3$ in FIG. 2*b*, determined by the time constant of the RC network comprising resistor 63 and capacitor 61. The combination of the time delay due to the interval between times $t_2$ and $t_1$ and that of this RC time constant will allow tube 25 to conduct at time $t_4$ after tube 21 has itself begun to conduct, thus causing tube 21 to then be cut off as previously explained, if signal $Q^2.A$ appears. The time interval between times $t_4$ and $t_1$ has been arbitrarily established at approximately 500 microseconds by use of particular values for resistor 63 and capacitor 61 and other pertinent circuit elements.

The logical manner in which the end of information is remembered is as follows. The tape moves in a forward direction as indicated by arrow 9, FIG. 1. When the block pulse head develops the signal $$-\frac{d\phi}{dt}$$

in response to movement of arrow 54 in the rectangle shown in FIG. 4, signal B appears at the "and" gate 31 as the output of the block pulse amplifier 30; almost immediately thereafter signal A appears as the other output of amplifier 30. Prior to this the production of $K^1$ by read amplifier 35 triggers flip-flop 34 producing signal $\overline{Q}^1$ and impressing it on "and" gate 31. "And" gate 31 thus has impressed at its input terminals all three signals necessary to produce output signal $J^2$. This output signal $J^2$ will induce flip-flop 26 to provide signal $Q^2$ which will trigger reverse thyratron 21. The energizing of reverse thyratron 21 will cause forward thyratron 20 which had previously been conducting (and thus causing the tape 10 to be driven in the forward direction as previously explained), to be cut off at time $t_1$. Jam roller 15 will thus be jammed against reverse capstan 16 causing the tape 10 to stop and then begin to move in a reverse direction. As the tape 10 moves in this reverse direction, the end of block signal.

$$-\frac{d\phi}{dt}$$

(designated as 69′ in FIG. 2*b*) will again be impressed on block pulse head 11. The design of head 11 and the recording method herein employed is such that signal $$-\frac{d\phi}{dt}$$

will be read by head 11 regardless of its relative motion with respect to tape 10 whenever a binary 0 is recorded in the block pulse channel. Signal $Q^2$ still remains as the output signal of flip-flop 26 and now signal A will again be developed, indicated as 70′ in FIG. 2*b*. The concurrence of signals $Q^2$ and A at "and" gate 27 causes the "and" gate 27 to develop signal $J_s$ at time $t_4$, which energizes stop thryratron 25. As previously explained with respect to FIG. 3, the energizing of stop thyratron 25 will cut reverse thyratron 21 off and thus the tape will stop its rearward motion and finally come to rest. FIG. 2*b* indicates that the signal to reverse thyratron 21, namely, signal $Q^2$ designated at 75 in FIG. 2*b* occurs when the signal $$-\frac{d\phi}{dt}$$

first produces a signal B, designated at 71 in FIG. 2*b* at time $t_1$. Signal A, designated as 70 in FIG. 2*b*, appears shortly thereafter as indicated, at time $t_2$. Thus, signals $Q^2$ and A occur concurrently at "and" gate 27, at time $t_2$, and a signal $J_s$ is impressed to stop thyratron 25, but stop thyratron 25 cannot then conduct. The reason for the inability of stop thyratron 25 from then conducting current is due to the fact that the combination of resistor 63 and capacitor 61 provides a time delay, as previously explained, which precludes tube 25 from firing even though the necessary input signals to its grid appear.

At the end of block 50, a binary 111111 is recorded as previously explained, which causes a signal $K^1$ to be impressed on read amplifier 35. This signal is then amplified and impressed as input $K^1$ to flip-flop 34, thus causing flip-flop 34 to develop an output signal $\overline{Q}^1$. Of course, when the succeeding information block 53 next comes to pass under read head 36, signal $\overline{Q}^1$ remains as the output signal of flip-flop 34. Signal $$-\frac{d\phi}{dt}$$

will be impressed on read head 11 by the end of information marker 54 simultaneously with the appearance of information block 53 under read head 36. This signal $$-\frac{d\phi}{dt}$$

again is divided into two components A and B (designated 70′ and 71′ in FIG. 2*b*) as the output signal of amplifier 30. Signal B (71′) appears first in point of time, thus the conditions for "and" gate 31 to produce an output $J^2$, are met. That is, the simultaneous occurrence of input signal B, $\overline{Q}^1$, and *Cp* at the input terminals of "and" gate 31. Thus, gate 31 now again provides output signal $J^2$ to flip-flop 26, causing flip-flop 26 to develop signal $Q^2$ at its output terminal. This signal $Q^2$ triggers reverse switch or thyratron 21 causing the tape 10 to stop and begin motion in the reverse direction.

The signal $Q^2$ is also impressed at "and" gate 27. "And" gate 27 thus has its conditions met for the development of signal $J_s$ and such signal $J_s$ is therefore impressed at the input of stop thyratron 25. It would at first appear that the occurrence of signal $J_s$ at the input of thyratron 25 at time $t_2$ (see FIG. 2*b*), very shortly after the occurrence of signal $Q^2$ as shown at 75 at time $t_1$, at the input of tube 21 would almost immediately cause tube 25 to fire, thus turning tube 21 off. But in accordance with the explanation previously presented, this will not occur because of the time delay due to the RC network comprising resistor 63 and capacitor 61.

There will be this time delay before the anode of tube 25 will again rise to +B potential to allow it to become conductive.

Tube 25 will be in an operable condition after the RC time delay of approximately 500 microseconds. At that time $t_4$, the signal $$-\frac{d\phi}{dt}$$

obtained upon reading of arrow 54 by head 11, will again cause signal $J_s$ to be impressed at the input of stop thyratron 25 and will now cause the reverse thyratron 21 to be cut off. This will thus stop the motion of tape 10. The binary 0 represented by arrow 54 will now be positioned sufficiently rearward with respect to head 11 so that the signal $$-\frac{d\phi}{dt}$$

will again be in a pre-read position as desired.

The output $Q^1$ of flip-flop 34 indicates the beginning of a normal block of words and performs no control function as previously explained.

"And" gate 33 requires the simultaneous concurrence of signals A, $\overline{Q}^2$ and *Cp* to develop output signal $J^1$ to flip-flop 34.

Signals A and *Cp* appear at time $t_2$ and $t_4$ shown in FIG. 2*b*.

Signal $\overline{Q}^2$ only appears when flip-flop 26 is in a low state which is at all times except when signal $$-\frac{d\phi}{dt}$$

is impressed at the input of the block pulse channel read amplifier 30.

There has thus been disclosed an end of information identification system for storing or remembering the end of information position of a closed-loop magnetic tape without the use of individual memory devices for each tape of a series of tapes, only one such system as herein described being required (exclusive of the switching thyratrons) regardless of the number of tapes in the system.

What is claimed as new is:

1. The system for identifying the end of information position of a magnetic storage tape by a previously recorded end of information marker recorded in a block pulse channel of said tape, and having a magnetic read device disposed contiguously to said tape, said system comprising first means for moving the tape in a first direction relative to the read device to read the end of information marker, second means for moving the tape in a reverse direction relative to said first direction with respect to the read device, first control means connected to engage and disengage the first tape moving means, second control means connected to engage and disengage the second tape moving means, and means responsive to the read device when the end of information marker is sensed for operating the first and second control means to sequentially disengage the first drive means, engage the second drive means and disengage the second drive means, whereby the tape is automatically rolled back into position to re-read the end of information marker when the first drive means is again engaged.

2. A system for identifying the end of information position of a closed-loop magnetic storage tape by a previously recorded end of information marker recorded in a block pulse channel of said tape, and having a magnetic read device disposed contiguously to said tape, said system comprising: first means for moving said tape in a first direction relative to said read device to read said end of information marker; second means for moving said tape in a reverse direction relative to said first direction with respect to said read device; control means connected to selectively disengage said first tape moving means, and means responsive to said read device controlling said control means to disengage both of said tape moving means to bring said tape to rest after said second means has moved said tape a sufficient distance in reverse relative to said first direction with respect to said read device to re-read said end of information marker.

3. Tape handling apparatus for driving a coded message tape in a forward direction for reading purposes and for driving said tape in a reverse direction in dependence of an end of message marker on said tape, comprising; electrically operated reversible tape drive means; control circuit means normally controlling said tape drive means to drive said tape in a forward direction; a tape reader device disposed to read said end of message marker on said tape and having an electrical output connected to control said control circuit means upon reading of said end of message marker, to reverse said tape drive means and reverse the direction of movement of said tape; and stop circuit means connected to be controlled by said tape reader device and having an output connected to deenergize said control circuit means and stop said tape drive means, said stop circuit means being time delayed to be unresponsive to the electrical output of said tape reader device except after reversing of said tape and movement of said end of message marker past said tape reader device during reverse movement of said tape.

4. A system for identifying the end of information position of a closed-loop magnetic storage tape by a previously recorded end of information marker recorded in a block pulse channel of said tape, said system comprising: a continuously revolving forward capstan adapted to move said tape in a forward direction; a forward jam roller spaced from said tape and said forward capstan and movable to engage and press said tape against said forward capstan; forward electromagnetic means connected to said forward jam roller and operable to press said forward jam roller against said tape, pressing said tape against said forward capstan to drive said tape in a forward direction; a continuously revolving reverse capstan adapted to drive said tape in a reverse direction; a reverse jam roller spaced from said tape and said reverse capstan and movable to engage and press said tape against said reverse capstan; reverse electromagnetic means connected to said reverse jam roller and operable to press said reverse jam roller against said tape, pressing said tape against said reverse capstan to drive said tape in a reverse direction; control means having output connections with both said forward and reverse electromagnetic means and normally controlling said electromagnetic means to operate said forward jam roller to effect movement of said tape in a forward direction; a magnetic read device disposed adjacent said block pulse channel of said tape to sense said end of information marker and connected to said control means to control said control means to reverse said tape upon sensing of said end of information marker, and stop circuit means controlled by said read device and connected to control said control means to stop said tape upon sensing of said end of information marker when said tape is moving in said reverse direction.

5. In a closed-loop magnetic storage system of an electronic digital computer including a magnetic tape having an end of information marker recorded on the block pulse channel thereof adjacent the end of information recorded in other channels of said tape, the combination of: a first magnetic head disposed contiguously to said tape to read said block pulse channel; a second magnetic head adjacent said first magnetic head and disposed contiguously of said tape to read information recorded in said other channels of said tape; a continuously revolving forward capstan slidably engaging said tape and a continuously revolving reverse capstan, revolving oppositely to said forward capstan, slidably engaging said tape; a forward jam roller spaced from said tape and said forward capstan and movable to engage said tape and press said tape against said forward capstan to drive said tape in a forward direction; forward control means coupled to said forward jam roller and adapted to press said forward jam roller against said tape, pressing said tape against said forward capstan to drive said tape in said forward direction; a reverse jam roller spaced from said tape and said reverse capstan and movable to engage said tape and press said tape against said reverse capstan to drive said tape in a reverse direction; reverse control means coupled to said reverse jam roller and adapted to press said reverse jam roller against said tape, pressing said tape against said reverse capstan to drive said tape in said reverse direction; forward and reverse switching means respectively connected to control said forward and reverse control means; means controlled by said first magnetic head upon reading of said end of information marker when said tape is moving in said forward direction to operate said forward switching means to disengage said forward jam roller from said tape and to operate said reverse switching means to engage said reverse jam roller with said tape to reverse said tape; and means controlled by said first magnetic head and operable upon a second reading of said end of information marker to operate said reverse switching means to disengage said tape.

6. The system defined in claim 5 wherein said forward switching means includes a thyratron and said forward control means includes solenoid means coupled to said thyratron and a computer coupled to said thyratron and adapted to impress a signal on the input of said thyratron causing said thyratron to develop a signal to energize said solenoid means.

7. The system defined in claim 5 wherein said reverse switching means includes a thyratron and said reverse control means includes solenoid means coupled to said thyratron; an amplifier coupled to said first magnetic head and adapted to produce an output signal in response to said end of information marker being read by said first magnetic head; a gating circuit coupled inputwise to said amplifier to receive said output signal of said amplifier; a first bistable electronic device coupled inputwise to said gating circuit to be controlled by the output of said gating circuit and having an output circuit connected to control said thyratron; a second bistable electronic device having an output circuit connected as input to said gating circuit; and a clock pulse generator connected as input to said gating circuit, said gating circuit being adapted to produce an output signal and impress it on said first bistable electronic device only when a clock pulse signal, a signal from said amplifier and a signal from said second bistable electronic device are simultaneously received by said gating circuit, said first bistable electronic device being adapted to produce an output signal and impress it on said thyratron in response to said output signal from said gating circuit, and said solenoid means being adapted to jam said reverse jam roller against said reverse capstan in response to said output signal from said thyratron.

8. Tape handling apparatus for driving a coded message tape in a forward direction for reading purposes and for driving said tape in a reverse direction in dependence upon an end of message marker on said tape, comprising: reversible tape drive means having forward, reverse, and stop electrical input sections; control means connected to and normally controlling said forward input section to drive said tape in a forward direction; circuit means including a transducer responsive to said end of message marker on said tape for producting a pair of time displaced electrical signals occurring in the same time sequence for either direction of relative movement between said end of message marker and said transducer; a reverse control circuit connected between said circuit means and said reverse input section of said reversible drive means to reverse said reversible drive means in dependence upon the first occurring of said time displaced electrical signals; a stop control circuit connected between said circuit means and said stop control section of said reversible drive means to stop said reversible drive means in dependence upon the second occurring of said time displaced electrical signals; and electrical means connected with said stop input section of said reversible drive means for preventing response of said stop input section to said second occurring time displaced electrical signal until the second occurrence of said second occurring electrical signal.

9. Tape handling apparatus for driving a coded message tape in a forward direction for reading purposes and for driving said tape in a reverse direction in dependence upon an end of message marker on said tape, comprising: an electrically operated forward tape drive and an electrically operated reverse tape drive; forward electrical control means connected to said forward tape drive to control said forward drive between operative and inoperative conditions; reverse electrical control means connected to said reverse tape drive to control said reverse drive between operative and inoperative conditions; circuit means electrically interlocking said forward control means and said reverse control means to at least temporarily prevent operation of one control means in dependence upon operation of the other; stop control means electrically connected to said forward control means and said reverse control means to at least temporarily inactivate whichever of said forward and reverse control means is operating when said stop control means is operated and to be at least temporarily held inoperative by operation of either of said forward or reverse control means; a tape reader disposed to detect said end of message marker on said tape; circuit means connected to and responsive to said tape reader for producing a pair of time displaced output signals; circuit means responsive to the first occurring of said output signals for operating said reverse control means to reverse said tape; and circuit means responsive to the second occurring of said output signals for operating said stop control means, said stop control means being temporarily inoperative during the first occurrence of said second output signal because of operation of said reverse control means and responding after reversing of said tape to the second occurrence of said second output signal.

10. Tape handling apparatus for controlling the reversing and stopping of a coded message tape in dependence upon an end of message marker on said tape, comprising: electrically operated reversible tape drive means; control circuit means connected to said reversible drive means and normally controlling said reversible drive means to drive said tape in a forward direction; tape reader means disposed to detect said end of message marker on said tape and having an electrical output connected to and controlling said control circuit means to reverse said reversible drive means and reverse the direction of movement of said tape upon detection of said end of message marker; and a time delayed stop circuit connected to and responsive to said tape reader device and connected to and controlling said control circuit means to stop said reversible drive means, the time delay of said stop circuit preventing response thereof to the electrical output of said tape reader means upon detection of said end of message marker when said tape is moving in said forward direction and permitting response thereof to the output of said tape reader means upon detection of said end of message marker when said tape is moving in said reverse direction.

11. A system for identifying the end of information position of a magnetic storage tape by a previously recorded end of information marker recorded in a block pulse channel of said tape, and having a magnetic read device disposed contiguously to said tape, said system comprising: first means for moving said tape in a first direction relative to said read device to read said end of information marker; second means for moving said tape in a reverse direction relative to said first direction with respect to said read device; control means connected to selectively disengage said first tape moving means, and means responsive to said read device controlling said control means to disengage both of said tape moving means to bring said tape to rest after said reverse moving means has moved said tape a sufficient distance rearward relative to said first direction with respect to said read device to re-read said end of information marker.

12. A system for identifying the end of information position of a magnetic storage tape by a previously recorded end of information marker recorded in a block pulse channel of said tape, said system comprising: a continuously revolving forward capstan adapted to move said tape in a forward direction; a forward jam roller spaced from said tape and said forward capstan and movable to engage and press said tape against said forward capstan; forward electromagnetic means connected to said forward jam roller and operable to press said forward jam roller against said tape, pressing said tape against said forward capstan to drive said tape in a forward direction; a continuously revolving reverse capstan adapted to drive said tape in a reverse direction; a reverse jam roller spaced from said tape and said reverse capstan and movable to engage and press said tape against said reverse capstan; reverse electromagnetic means connected to said reverse jam roller and operable to press said reverse jam roller against said tape, pressing said tape against said reverse capstan to drive said tape in a reverse direction; control means having output connections with both said forward and reverse electromagnetic means and normally controlling said electromagnetic means to operate said forward jam roller to effect movement of said tape in a forward direction; a magnetic read device disposed adjacent said block pulse channel of said tape to sense said end of information marker and connected to said control means to control said control means to reverse said tape upon sensing of said end of information marker, and stop circuit means controlled by said read device and connected to control said control means to stop said tape upon sensing of said end of information marker when said tape is moving in said reverse direction.

References Cited in the file of this patent

UNITED STATES PATENTS

| | | |
|---|---|---|
| 2,193,967 | Kleinschmidt | Mar. 19, 1940 |
| 2,617,704 | Mallina | Nov. 11, 1952 |
| 2,782,398 | West et al. | Feb. 19, 1957 |